United States Patent [19]

Camenisch

[11] Patent Number: 4,860,979
[45] Date of Patent: Aug. 29, 1989

[54] ADJUSTABLE FASTENING STRAP

[75] Inventor: Gian C. Camenisch, Magden, Switzerland

[73] Assignee: A. Raymond, Lorrach, Fed. Rep. of Germany

[21] Appl. No.: 167,176

[22] Filed: Mar. 11, 1988

[30] Foreign Application Priority Data

Mar. 11, 1987 [DE] Fed. Rep. of Germany ....... 3707782

[51] Int. Cl.$^4$ ............................................... F16L 3/08
[52] U.S. Cl. .................. 248/74.3; 24/16 PB; 24/17 AP
[58] Field of Search ............... 248/74.3, 71, 73, 231; 24/16 PB, 30.5 P, 16 R, 305, 336, 664, 17 A, 17 AP

[56] References Cited

U.S. PATENT DOCUMENTS

| 2,453,319 | 11/1948 | Hollyday | 248/74.3 |
| 4,003,106 | 1/1977 | Schumacher | 24/16 PB |
| 4,235,404 | 11/1980 | Kraus | 24/16 PB X |
| 4,261,539 | 4/1981 | Albern | 24/16 PB X |
| 4,518,297 | 5/1985 | Kraus | 248/74.3 X |
| 4,728,064 | 3/1988 | Caveney | 248/74.3 |

FOREIGN PATENT DOCUMENTS 2188362 9/1987 United Kingdom ............ 24/16 PB

Primary Examiner—J. Franklin Foss
Attorney, Agent, or Firm—Finnegan, Henderson, Farabow, Garrett & Dunner

[57] ABSTRACT

A plastic fastening strap for holding a plurality of elongated objects having a holding part with a locking projection and a flexible tightening band having a plurality of spaced transverse crossbars. After the band is wrapped around the objects, it is snapped onto the projection and locked in place. To facilitate hooking and unhooking of the band while at the same time preventing accidental unhooking, the locking projection has a downwardly extending notch for engaging and holding a crossbar of the band and a thickness forward of the notch that is approximately 10% larger than the longitudinal distance between two adjacent crossbars.

6 Claims, 2 Drawing Sheets

ADJUSTABLE FASTENING STRAP

BACKGROUND OF THE INVENTION

This invention relates to an adjustable plastic fastening strap and more particularly to a strap for holding a bundle of wires or cables.

A similar fastening strap is illustrated in U.S. Pat. No. 4,261,539 and is used to fasten cables of different diameters and in particular cable harnesses. These straps offer a great advantage in assembly in that after they have been wrapped around the object or objects to be fastened, they can easily be locked-in place by means of a crossbar on one end of the strap that engages with a locking hook on the body of the strap. However, in use the straps have to be overstretched somewhat so that the particular crossbar can be pulled over the locking hook, the strap then snapping back elastically under the hook. If the strap is to be unfastened later, the strap end must first be pulled down until the hooked-in crossbar is free of the hook and then again stretched back over the hook.

This overstretching of the strap when being hooked or unhooked is considered a drawback because it requires a certain amount of force. There is also the danger of the free end of the strap being pulled down by accident and becoming unhooked.

SUMMARY OF THE INVENTION

Accordingly, it is the object of the invention to provide a new and improved fastening strap in which the hooking or unhooking is easily facilitated and accidental unhooking is avoided. This is achieved in accordance with the present invention by providing a plastic fastening strap for holding a plurality of elongated objects to the support having a holding part with means for securing it to the support, a flexible tightening band integral with and extending outwardly from one side of the holding part, said band having a plurality of spaced transverse crossbars, and a locking projection integral with and extending outwardly from the opposite side of the holding part that cooperates with the crossbars after the band is wrapped around the objects to lock the band in place. The locking projection has a downwardly extending notch forming a locking hook for engaging and holding a crossbar of the band and has a thickness foward of the notch that is slightly larger than the longitudinal distance between the crossbars so that adjacent crossbars of the band are spread apart as they are brought down over the locking projection and before a crossbar engages with the notch.

BRIEF DESCRIPTION OF THE DRAWINGS

An embodiment of the invention is shown in the following drawings of which.

DETAILED DESCRIPTION OF THE INVENTION

Figure 5:
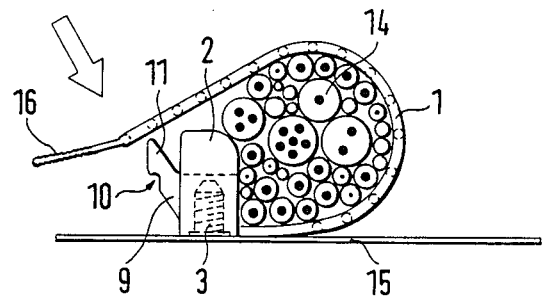
FIG. 5 shows the fastening strap wrapped around a plurality of cables just before locking the band in place.
Figure 6:
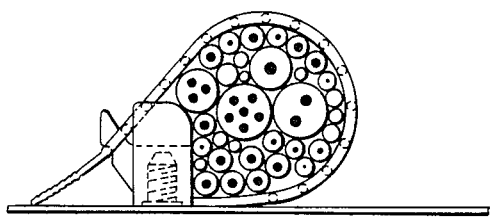
FIG. 6 shows the fastening strap with the band locked in place.
Figure 7:
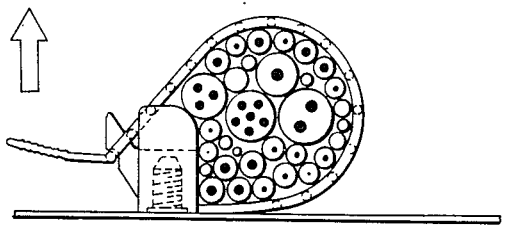
FIG. 7 shows the fastening strap when the band is being unlocked.

The fastening strap shown in the drawings is made of hard-elastic plastic and serves to hold cables, cable harnesses, tubes and similar elongated objects of different diameters. Essentially, it consists of a flexible tightening band on loop 1 having a plurality of spaced crossbars 8 and an integral holding part 2. Holding part 2 has means for securing the strap to a support such as a pin-seating hole or opening 4 for pressing on a threaded pin 3 as shown in FIGS. 5–7. Hole 4 is formed by four arcuate clamping walls 5 elastically connected to holding part 2 by a plurality of radial walls 6. The arcuate shaped clamping walls 5 may be replaced by any suitable surfaces or clamping elements that grip and hold part 2 to a threaded pin.

Figure 1:
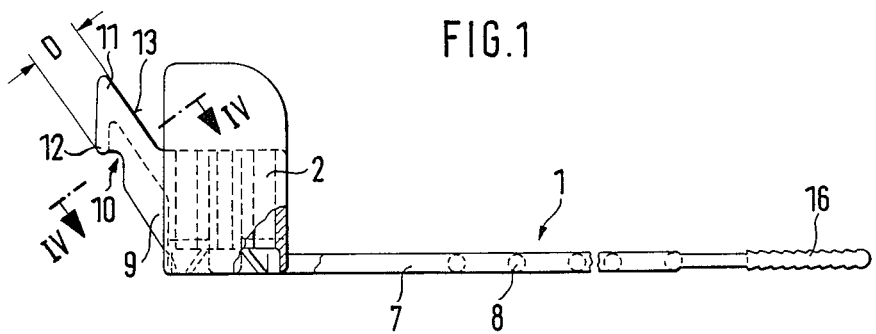
FIG. 1 is a sideview of the plastic fastening strap of this invention.

Flexible band 1 consists of two longitudinal stringers 7 that are integral with and extend out from the lower part of one side of the holding part 2 and a plurality of spaced transverse crossbars 8 that cooperate with a locking projection 9 integral with and extending outwardly from the opposite side of holding part 2. The band terminates in an end 16 that is suitably designed to be gripped by the fingers. Projection 9 has a notch 10 forming a locking hook on the projection that matches the cross-sectional shape of crossbars 8 and has an upwardly extending tip 11. As the band is brought down over the tip of the projection, it is designed to force itself, like a wedge between the two adjacent crossbars 8. To achieve this, projection 9 is approximately 10% larger in its initial thickness D forward of notch 10 between its front and rear surfaces 12 and 13 than the longitudinal distance between two adjacent crossbars, so that the crossbars 8 will be spread apart somewhat when band 1 is brought down over tip 11 until a crossbar 8 snaps into notch 10. See FIGS. 1 and 4.

Figure 2:
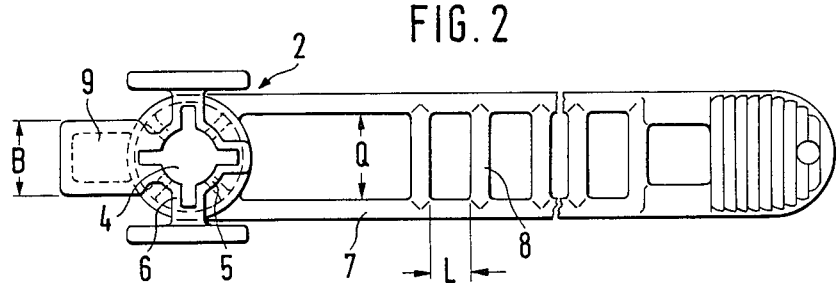
FIG. 2 is a top view of the same strap.
Figure 3:
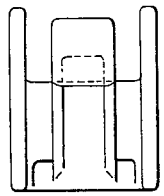
FIG. 3 is a left side view of the locking projection of the strap showing the locking hook.
Figure 4:
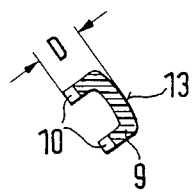
FIG. 4 is a cross-section of the locking hook taken along line IV—IV of FIG. 1.

However, the width B of projection 9 (FIG. 2) is approximately 10 to 15% less than the distance Q between crossbar stringers 7 to compensate for this spreading of the crossbars 8. Preferably, crossbars 8 are spread by making the rear side 13 of projection 9 curved as shown in FIG. 4. Then the wedging effect will be mostly in the middle of the rear of the two adjacent crossbars 8 during the hooking.

Considering the variable diameters of the cable harnesses 14 to be fastened, projection 9 is joined to holding part 2 so that when a harness of maximum diameter is used it extends approximately perpendicular to the direction of tension of crossbar band 1. Moreover, tip 11 preferably slopes toward the side of the band, so that the crossbar 8 to be hooked in will be tensioned only minimally when both small and large diameter harnesses are used.

FIGS. 5 through 7 illustrate operation of the fastening strap, holding part 2 in each case being mounted on a threaded bolt 3 on a support or base plate 15.

In FIG. 5, crossbar band 1, after it is wrapped around a cable harness 14, is pressed down so that at least one crossbar 8 is in front of tip 11 of the locking projection 9 until it passes under the end 12 of the locking hook and snaps into notch 10 as shown in FIG. 6. If the strap is then to be unfastened, band end 16 is merely pulled up in the direction of the arrow as shown in FIG. 7 whereby the crossbars 8 on either side of the locking projection are elastically spread apart by the wedge created between the front and back surfaces of the projection, until the snapped-in crossbar 8 passes over the end 12. Accidental unfastening is avoided by this configuration of the locking projection because the hooked-in crossbar cannot be forced free simply by pulling down on the free end 16 as in prior art devices. In that case, the rear crossbar will merely be pulled against the surface 13 preventing the front crossbar from slipping out of the notch. Rather, as shown, it is necessary to pull the free end of the band of the strap upwardly to unfasten the strap.

What is claimed is:

1. A plastic fastening strap for holding a plurality of elongated objects to a support comprising a holding part having means for securing it to the support, a flexible tightening band integral with and extending outwardly from one side of the holding part, said band having a plurality of spaced transverse crossbars, and a locking projection integral with and extending outwardly from the opposite side of the holding part that cooperates with the crossbars after the band is wrapped around the objects to lock the band in place, said projection having a downwardly extending notch forming a locking hook for engaging and holding a crossbar of the band and having a thickness forward of the notch that is slightly larger than the longitudinal distance between the crossbars so that adjacent crossbars of the band are spread apart as they are brought down over the locking projection and before a crossbar engages with the notch.

2. The strap of claim 1, wherein the thickness of the projection is approximately 10% larger than the distance between adjacent crossbars.

3. The strap of claim 1, wherein the locking projection extends upwardly from the base of the holding part at an angle so that it is approximately perpendicular to the direction of tension of the tightening band.

4. The strap of claim 1, wherein the width of the projection foward of the notch is less than the length of the crossbars of the tightening band.

5. The strap of claim 4, wherein the tightening band comprises a pair of spaced longitudinal stringers integral at one end with the base of the holding part, and terminating in a thickened end portion for gripping by the fingers, the crossbars being integral with and extending transverse to the stringers intermediate the ends of the stringers, the thickness of the projection forward of the notch being approximately 10% larger than the distance between adjacent crossbars and its width being approximately 10% less than the distance between the stringers of the tightening band.

6. The strap of claim 1, in which the side of the locking projection opposite the notch has a curved cross section so that the crossbars are spread apart more in the middle than at their ends.

* * * * *